(12) United States Patent
Becker et al.

(10) Patent No.: US 8,679,334 B2
(45) Date of Patent: Mar. 25, 2014

(54) POWER STEERING FILTER ASSEMBLY

(75) Inventors: Aaron Becker, Atlanta, GA (US);
Myron Stein, Laguna Niguel, CA (US)

(73) Assignee: AirSept, Inc., Atlanta, GA (US)

( * ) Notice: Subject to any disclaimer, the term of this patent is extended or adjusted under 35 U.S.C. 154(b) by 247 days.

(21) Appl. No.: 13/086,439

(22) Filed: Apr. 14, 2011

(65) Prior Publication Data

US 2011/0253607 A1 Oct. 20, 2011

Related U.S. Application Data

(60) Provisional application No. 61/328,210, filed on Apr. 27, 2010, provisional application No. 61/324,009, filed on Apr. 14, 2010.

(51) Int. Cl.
| | | |
|---|---|---|
| *B01D 35/06* | (2006.01) | |
| *B01D 35/147* | (2006.01) | |
| *B01D 27/10* | (2006.01) | |

(52) U.S. Cl.
USPC ...... 210/223; 210/131; 210/132; 210/167.29; 210/167.31; 210/232; 210/254; 210/295; 210/352; 210/342; 210/416.5; 210/445

(58) Field of Classification Search
USPC ............ 210/223, 131, 132, 167.29, 167.31, 210/232, 354, 295, 352, 342, 416.5, 445, 210/222, 167.03, 167.01, 167.04, 167.06, 210/167.08, 167.09, 167.32, 130, 237, 238, 210/254, 297, 435, 450, 483; 184/6.24, 184/6.25

See application file for complete search history.

(56) References Cited

U.S. PATENT DOCUMENTS

| | | | | |
|---|---|---|---|---|
| 2,459,318 | A | | 1/1949 | Hallinan |
| 2,980,257 | A | * | 4/1961 | Paton ............................ 210/223 |
| 3,397,516 | A | | 8/1968 | Kobnick |
| 3,501,005 | A | * | 3/1970 | Spargo et al. ................... 210/90 |
| 3,817,380 | A | | 6/1974 | Brown |
| 3,993,561 | A | * | 11/1976 | Swearingen .................. 210/131 |
| 4,082,665 | A | * | 4/1978 | Schneider et al. .............. 210/91 |
| 4,197,207 | A | | 4/1980 | Rosaen et al. |
| 4,759,842 | A | * | 7/1988 | Frees et al. ...................... 210/94 |
| 5,972,213 | A | | 10/1999 | Golan |

(Continued)

FOREIGN PATENT DOCUMENTS

WO  WO 2004/022202 A1  3/2004

OTHER PUBLICATIONS

European Search Report—EP11162493.8.

*Primary Examiner* — David C Mellon
(74) *Attorney, Agent, or Firm* — Womble Carlyle Sandridge & Rice, LLP

(57) ABSTRACT

A power steering fluid filter includes a housing that defines an interior chamber, an inlet port communicating with the upstream end of the interior chamber, and an outlet port communicating with the downstream end of the interior chamber. A movable thimble filter is disposed within the housing and an annular magnet is located at the mouth of the thimble filter. A spring biases the thimble filter and magnet toward the inlet port of the housing. In use, power steering fluid passes through the housing and debris is captured by the thimble filter. Ferrous particles entrained in the fluid flow are attracted to and captured by the magnet. When the thimble filter becomes clogged, it is displaced by the pressure of the fluid against the clogged filter so that fluid can flow around and bypass the thimble filter while still being exposed to the magnet for removing ferrous particles.

18 Claims, 3 Drawing Sheets

(56) References Cited

U.S. PATENT DOCUMENTS

| | | | |
|---|---|---|---|
| 6,337,012 B1 * | 1/2002 | Devine | 210/223 |
| 6,423,215 B1 | 7/2002 | Stein | |
| 2002/0074273 A1 | 6/2002 | Golovatai-Schmidt et al. | |
| 2003/0168394 A1 * | 9/2003 | Gill | 210/249 |
| 2006/0102533 A1 | 5/2006 | Faria | |

* cited by examiner

POWER STEERING FILTER ASSEMBLY

REFERENCE TO RELATED APPLICATIONS

Priority is hereby claimed to the filing dates of U.S. provisional application No. 61/324,009 filed on 14 Apr. 2010 and U.S. provisional application No. 61/328,210 filed on 27 Apr. 2010.

TECHNICAL FIELD

This disclosure relates generally to automotive power steering systems and pumps and more specifically to filters for continuously removing entrained debris from the flow of power steering fluid circulating through a power steering system.

BACKGROUND

An automotive power steering system includes a pump that circulates power steering fluid through the steering gear of a vehicle, through a cooler, and back through the pump. In the process, debris, including small ferrous metal particles from meshing metal surfaces of the system, can become entrained in the flow of power steering fluid. This debris is a major cause of power steering system failure. It travels via the power steering fluid throughout the entire steering system eroding and clogging various components and hoses, which can lead to expensive repairs. Simply placing an in-line filter in the power steering fluid circuit can trap some of this debris, but ferrous metal particles, which can do the most damage, can pass through the filter. Further, the filter can become clogged with debris and this can restrict the flow of fluid and affect adversely the operation of a vehicle's power steering. A need exists for a method and apparatus for trapping debris including ferrous metal particles within a flow of power steering fluid in a way that is efficient and reliable but does not affect the flow of fluid should a clog occur within the filter. It is to the provision of such a method and apparatus that the present invention is primarily directed.

SUMMARY

U.S. provisional patent application Nos. 61/324,009 and 61/328,210 to which priority is claimed above are hereby incorporated by reference in their entireties.

Briefly described, a power steering system includes a fluid filter that comprises a housing with a fluid inlet and a fluid outlet. The housing is sized to be spliced, via its inlet and outlet, into a power steering fluid return hose preferably just before the fluid re-enters the power steering pump for recirculation through the power steering system. A thimble filter is disposed within the housing in the path of the flow to trap entrained debris in the flow. An annular magnet is disposed within the thimble filter and functions to trap small ferrous metal particles that may have become entrained within the flow. A spring with a preselected spring constant biases the filter and magnet toward the inlet end of the housing so that power steering fluid is constrained to flow through the magnet and through the filter during normal operation. If the filter becomes clogged, the pressure of the fluid overcomes the bias of the spring and moves the filter and magnet away from the inlet end of the housing to a bypass position so that fluid can flow around and bypass the clogged thimble filter. Nevertheless, the annular magnet continues to trap ferrous metal particles even when the clogged filter is in its bypass position.

Thus, a power steering fluid filter is provided that effectively traps debris and ferrous particles entrained with the flow of power steering fluid, including small ferrous particles that might otherwise pass through a simple mesh filter. The filter element of the filter automatically moves to a bypass position should the filter element become clogged to prevent degradation of vehicle steering while continuing to trap ferrous particles. These and other features, aspects, and advantages of the method and apparatus of this disclosure will become more apparent upon review of the detailed description set forth below taken in conjunction with the accompanying drawing figures, which are briefly described as follows.

DETAILED DESCRIPTION

Figure 1:
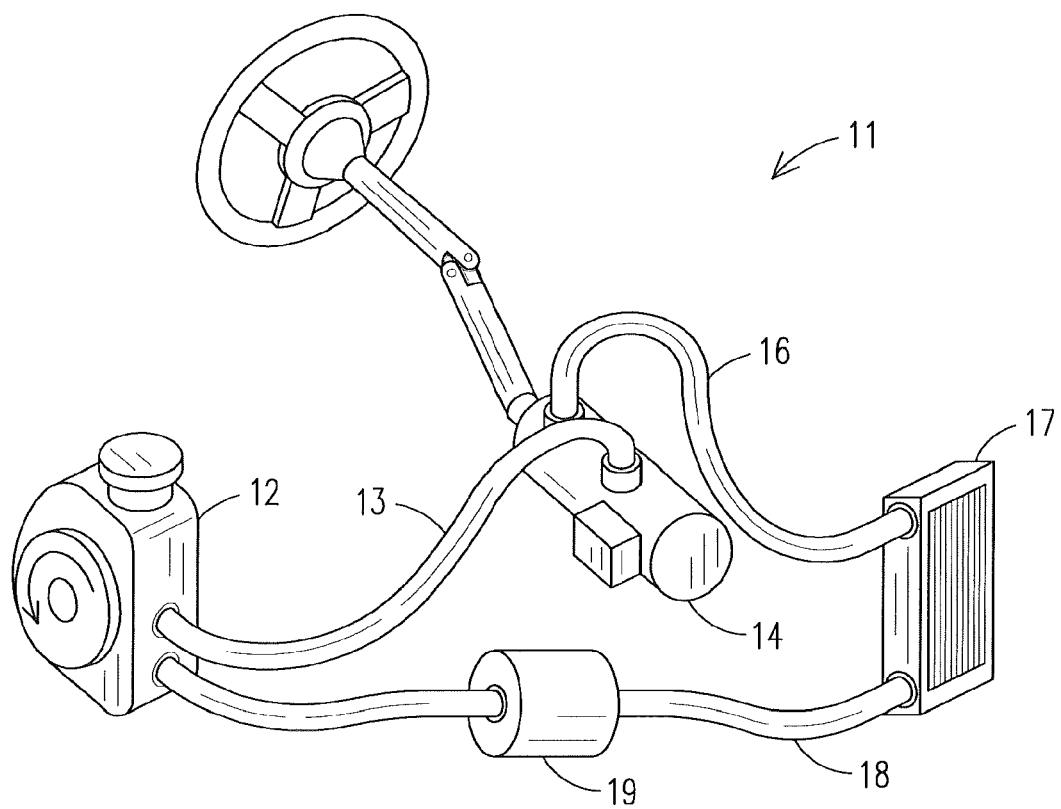
FIG. 1 is a schematic illustration of an automotive power steering system illustrating the power steering pump, the steering gear, the cooler, and a preferred placement of the filter of this disclosure in the system.

Referring now in more detail to the drawing figures, wherein like reference numerals indicate like parts throughout the several views, FIG. 1 illustrates, in simplified form, a typical automotive power steering system. The power steering system 11 includes a power steering pump 12 that is driven by the drive belt of an engine to circulate power steering fluid through the system 11. More specifically, fluid is first delivered through a high pressure hose 13 to the power steering gear 14 of the steering system, where it hydraulically enhances the steering functions of the vehicle. From the steering gear 14, the fluid circulates though hose 16 to and through a cooler 17 to remove heat imparted to the fluid in the steering gear 14. The cooled power steering fluid is then circulated through a low pressure hose 18 back to the pump 12 for another cycle. A power steering fluid filter 19 according to the present disclosure is spliced in-line with the low pressure hose 18 so that the fluid flows through the filter 19 as it is returned to the pump. The filter 19 removes entrained debris within the power steering fluid and also traps smaller ferrous particles that might otherwise pass through the filter element, as described in more detail below.

Figure 2:
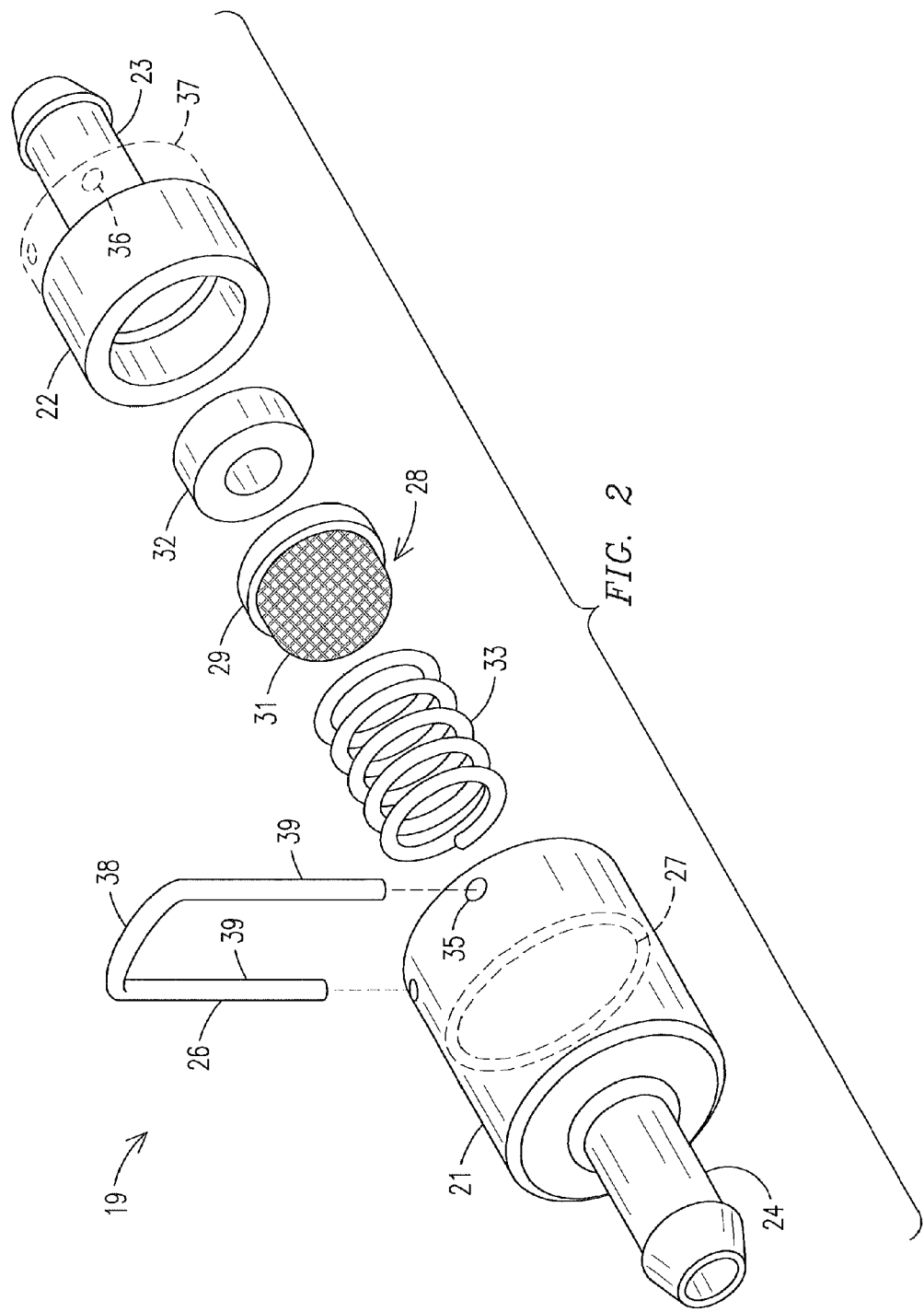
FIG. 2 is a perspective exploded view of a power steering fluid filter that embodies principles of the disclosure in one preferred form.

FIG. 2 illustrates the power steering fluid filter of this disclosure in more detail and in an exploded perspective view. The filter 19 comprises an aluminum housing that is formed by a first housing portion 21 and a second housing portion 22. While aluminum is a preferred material, the housing also may be formed of other materials such as plastics if desired. The second housing portion 22 is sized to slide telescopically into the first housing portion 21 to form the housing, which defines a generally cylindrical interior chamber. A locking clip 26 is configured to be inserted through holes 35 or slots formed in the first housing portion 21 when the second housing portion is inserted therein to lock the second housing portion releasably to the first housing portion. In alternative aspects, the locking clip may also extend through slots or holes 36 formed in an extended second housing portion 37 (FIG. 2), or may extend behind the body of second housing portion 22 (FIGS. 3 and 4) to hold the second housing portion in place. In a preferred embodiment, the locking clip is a generally U-shaped spring clip having a bight portion 38 and legs 39 that can be slid and snapped into aligned slots in the first and second housing portions to lock them together and quickly pulled out of the slots by its bight portion to release the housing portions from each other.

An O-ring 27 preferably is disposed in an annular race within the first housing portion 21 and bears against the exterior surface of the second housing portion 22 when it is inserted into the first housing portion 21 to seal the chamber against leakage of power steering fluid. The O-ring also may be disposed on the second housing portion if desired and/or a structure other than an O-ring such as, for instance, a gasket may be used to form the seal. Further, the second housing portion may be threadably connected to the first housing portion, or it may be snap fitted, twist locked, or connected in any other appropriate manner in which a seal can be formed.

An inlet port 23 projects axially from the second housing portion 22 and an outlet port 24 projects axially from the first housing portion 21. For installation, the low pressure fluid hose 18 of a power steering system is cut and the resulting upstream end is connected to the inlet port 23 while the resulting downstream end is connected to the outlet port 24. In this way, the filter 19 is spliced into the low pressure hose so that power steering fluid is constrained to flow through the interior chamber of the filter before returning to the power steering pump. The filter also may be spliced into the high pressure hose, but this is not the most preferred technique at least because the higher fluid pressures in the high pressure hose require the filter to be constructed more robustly to withstand and operate with such pressures.

A filter element in the form of a thimble filter 28 in the illustrated embodiment is sized to fit within the interior chamber of the housing and comprises a metal rim 29 that defines a mouth of the thimble filter and a screen mesh 31 connected to the rim 29 and spanning the area of the mouth defined by the rim. Thus, fluid that enters the mouth is constrained to pass through the mesh screen so that debris within the fluid larger than the mesh size of the screen is trapped by the screen. An annular magnet 32 has a central opening and an outer diameter that may be slightly smaller than the interior diameter of the rim 29 so that the magnet 32 can fit within the thimble filter. Preferably, the metal rim 29 is made of a ferrous material such as steel or an iron alloy so that the magnet is attracted to the rim around the periphery of the magnet. In this way, the magnet can be sized to fit somewhat loosely within the mouth of the filter, where it is held moveably in place by the force of magnetic attraction to the rim 29. Thus, extreme precision is not required in the manufacture of the rim and the magnet and the magnet is free to move slightly when disposed within the rim of the thimble filter. Further, fluid may flow through the small space between the magnet and the rim so that a larger surface area of the magnet is exposed to fluid during operation. Finally, attraction of the magnet to the rim of the thimble filter simplifies assembly of the filter during fabrication because a precision assembly step is not required and the magnet need only be dropped into place within the thimble filter.

A coil spring 33 is disposed in the housing downstream of the thimble filter 28 and is sized to bear against the thimble filter and the downstream base of the chamber. Preferably, on end of the coil spring rests against the interior end of the first housing portion 21 and the other end of the coil spring bears against the underside of the rim 19 of the thimble filter 28 when the filter is assembled. The length and spring constant of the coil spring 33 is selected so that the spring biases the thimble filter 28 toward and against the upstream end of the chamber during normal operation of the filter 19. More specifically, as long as the thimble filter is relatively free of debris and relatively unclogged, the spring biases the thimble filter against the upstream base of the chamber (i.e. the interior end of the second housing portion 22) so that a fluid flow 40 (FIG. 3) of power steering fluid through the filter is constrained to pass the annular magnet 32 and flow through the mesh screen 31 of the filter 28. However, the spring constant of the coil spring 33 also is chosen such that should the thimble filter 28 become so clogged that its presence within the fluid flow interferes with or overly restricts the flow (and degrades the function of the steering system), the pressure of the fluid on the clogged thimble filter 28 moves the thimble filter against the bias of the coil spring 33 so that the mouth of the thimble filter is displaced from the upstream end of the chamber. In other words, the backpressure generated by fluid attempting to flow through the clogged thimble filter becomes sufficient to compress the coil spring and move the thimble filter to a bypass position (FIG. 4) within the housing. The fluid flow 41 of power steering fluid thus can flow around and bypass the clogged thimble filter so that the flow is not impeded. Nevertheless, the flow continues to pass and be exposed to the surface of the annular magnet so that ferrous particles entrained within the flow can still be captured, even if larger non-ferrous particles normally captured by the mesh screen are not. Clearly, when the filter enters its bypass mode, it should be serviced in short order.

The filter 19 is constructed to be easily serviceable by technicians. More specifically, the thimble filter and annular magnet can be replaced easily when clogged or at regular maintenance intervals. This is accomplished by pulling out the locking clip 26, pulling the upstream portion 22 of the housing out of the downstream portion, removing the thimble filter and/or the annular magnet, and replacing the thimble filter and/or annular magnet with new or recycled ones. Depending on the nature of the debris captured, a technician might simply clean the thimble filter and magnet and replace them back in the housing. Thus, the filter of this invention is easily serviceable as a standard part of regular automotive maintenance. Furthermore, its inclusion helps to protect the power steering system from erosion by debris and ferrous particles entrained within the power steering fluid, thereby extending the life of the power steering system.

Figure 3:
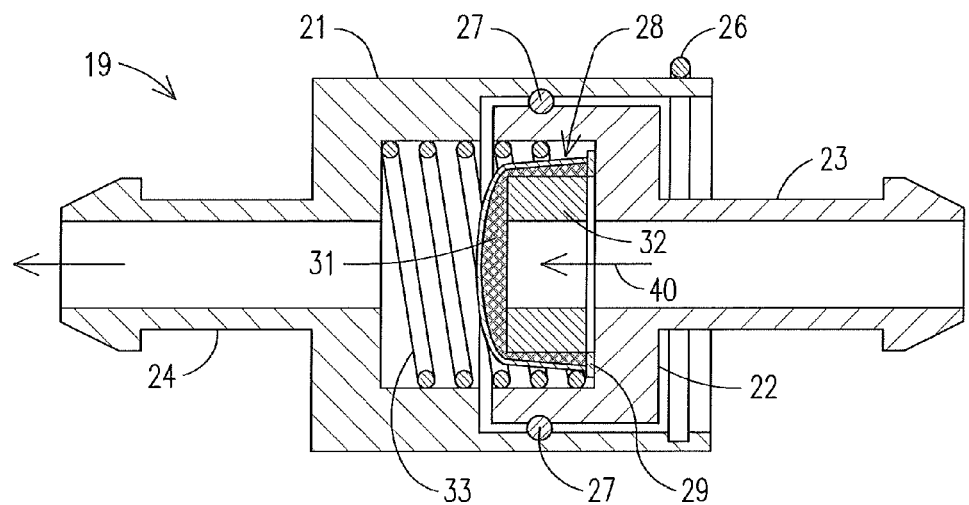
FIG. 3 is a cross-sectional view of the filter of FIG. 2 shown in its assembled configuration for splicing into a power steering fluid hose and with a thimble filter and magnet in an operable position.
Figure 4:
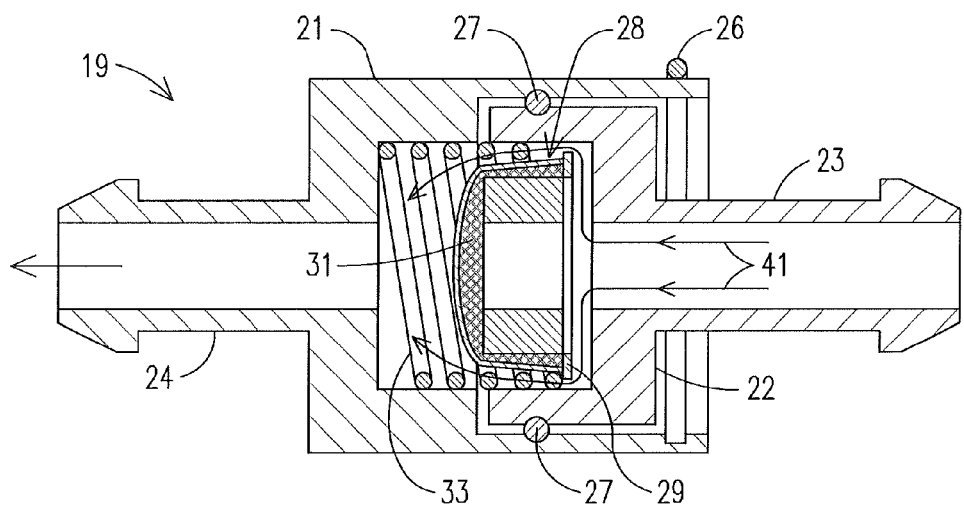
FIG. 4 is a cross-sectional view of the filter of FIG. 2 shown in its assembled configuration and with the thimble filter and magnet in a bypass position.

FIG. 3 shows the power steering filter 19 in cross section and in its assembled condition. The thimble filter 28 is seen with the magnet 32 disposed in the filter and partially encompassed by the rim 29 of the thimble filter. The coil spring 33 is seen to be partially compressed between the rim of the thimble filter 20 and the downstream end of the housing chamber. It can be seen from this drawing that power steering fluid flows in the direction of the arrows and in the process passes through and past the magnet and through the mesh screen of the thimble filter to be cleaned of debris. The O-ring 27 is seen between the upstream portion 22 and the downstream portion 21 of the housing and forms a seal to prevent power steering fluid from leaking from the chamber. The inlet and outlet ports are formed with sure grip barbed connections to insure against leaks of power steering fluid where the fluid hose is connected to the filter and to ease installation and maintenance.

One advantageous aspect of the power steering filter assembly of this disclosure is the ease of serviceability that it provides to automotive mechanics and maintenance individuals. More specifically, at predetermined intervals or when needed, the thimble filter and/or the annular magnet may be replaced easily and quickly. Maintenance personnel need only pull the locking clip 26, which allows the housing portions 21 and 22 to be separated. The spent thimble filter and/or annular magnet can then simply be removed and discarded or removed and cleaned, and a new filter and/or magnet or the cleaned ones replaced in the housing. The housing portions are then re-joined together and the locking clip reinserted. The power steering filter is thus restored to prime operating condition. Further, the entire procedure occurs without the need to remove the power steering hose from the ports 23 and 24 and thus avoids damaging the hose or causing leaks of power steering fluid.

The invention has been disclosed herein by exemplary embodiments and methodologies that illustrate the invention. It will be understood by skilled artisans, however, that a wide variety of variations, additions, and deletions, both subtle and gross, might be made to the illustrated embodiments within the scope of the invention. For instance, the filter may be provided with only the thimble filter or only the magnetic filter depending upon the type of debris to be captured. The particular shapes of the components in the illustrated embodiments are not critical and the filter housing and its internal components might take on any of a variety of equivalent shapes that perform the function of the filter to filter debris from power steering fluid. The preferred and illustrated embodiments are made of metal (aluminum housing, metal mesh screen, metal rim, etc.). However, other materials such as plastics and polymers or composites might be substituted with similar or equivalent results. Further, the body of the filter, or at least the upstream end of the chamber, might be made of a ferrous material such that the magnet may remain attached by magnetic attraction to the upstream end of the chamber when a clogged thimble filter moves to its bypass position. Alternatively, the magnet may be tightly secured to the filter so that it holds both in place against the upstream end of the chamber. Backpressure sufficient to dislodge the magnet then moves the magnet and filter to their bypass positions. With such an embodiment, the spring may be eliminated. These and other modifications and substitutions might well be made to the illustrated embodiments without departing from the spirit and scope of the invention as set forth in the claims.

What is claimed is:

1. A power steering fluid filter comprising:
    a housing defining an interior chamber having an upstream end and a downstream end;
    a fluid inlet communicating with the upstream end of the interior chamber;
    a fluid outlet communicating with the downstream end of the interior chamber;
    a filter element disposed within the interior chamber, the filter element being movable between an operable position wherein fluid flowing through the chamber passes through the filter element and a bypass position wherein fluid flowing through the chamber bypasses the filter element;
    a magnet disposed within and movable with the filter element for capturing entrained ferrous debris in fluid flowing through the filter the magnet having an annular body with an interior bore surface positioned to contact the fluid flow when the filter element is in the operable position and an end surface positioned to contact the fluid flow when the filter element is in the bypass position;
    a spring disposed in the housing yieldably biasing the filter element to its operable position;
    the housing being formed by a first housing portion and a second housing portion connected together in a sealed relationship; and
    a release mechanism holding the first and second housing portions together and being selectively removable to release the first and second housing portions from each other to permit replacement of the filter element.

2. The power steering fluid filter of claim 1 and wherein the filter element comprises a ferrous rim and wherein the magnet is at least partially surrounded by the ferrous rim to hold the magnet within the filter element via magnetic attraction to the ferrous rim.

3. The power steering fluid filter of claim 2 and wherein the filter element comprises a thimble filter.

4. The power steering fluid filter of claim 1 and wherein the spring has a spring constant and wherein the spring constant is preselected to allow the filter element to move from the operable position to the bypass position under the influence of fluid pressure when the filter element becomes at least partially clogged with debris.

5. The power steering fluid filter of claim 1 and wherein the first and second housing portions are telescopically connected together.

6. The power steering fluid filter of claim 5 and wherein the release mechanism comprises a removable locking clip.

7. The power steering fluid filter of claim 6 and wherein the locking clip extends through the first housing portion and the second housing portion and is removable to allow the housing portions to be separated.

8. The power steering fluid filter of claim 5 and further comprising an O-ring disposed between the first and second housing portions and forming a seal therebetween.

9. A vehicle power steering system incorporating the power steering fluid filter of claim 1.

10. The power steering fluid filter of claim 1 and wherein the housing is formed of aluminum.

11. A power steering fluid filter comprising:
    a housing defining an interior chamber having an upstream end and a downstream end;
    a fluid inlet communicating with the upstream end of the interior chamber;
    a fluid outlet communicating with the downstream end of the interior chamber;
    a thimble filter disposed within the interior chamber, the thimble filter having a rim and a mesh screen and being movable within the interior chamber between an operable position against the upstream end of the interior chamber wherein fluid flowing through the chamber passes through the mesh screen and a bypass position displaced from the upstream end of the interior chamber wherein fluid flowing through the chamber bypasses the mesh screen;
    a spring disposed in the housing yieldably biasing the mesh screen to its operable position, the spring being at least partially compressed between the downstream end of the interior chamber and the rim of the thimble filter;
    an annular magnet disposed within and movable with the filter element and having an interior bore surface positioned to contact the fluid flow when the filter element is in the operable position and an end surface positioned to contact the fluid flow when the filter element is in the bypass position;
    the housing being formed by a first housing portion and a second housing portion telescopically coupled together; and
    a locking clip holding the first and second housing portions together and being selectively removable to release the first and second housing portions from each other to permit replacement of the filter element.

12. The power steering fluid filter as claimed in claim 11 and wherein the locking clip is a generally U-shaped spring clip having first and second legs that extend through aligned openings in the first housing portion to hold the housing portions together, and a bight portion that can be grasped to remove the locking clip.

13. A fluid filter comprising:
a housing defining an interior chamber having an upstream end and a downstream end opposite the upstream end;
a fluid inlet communicating with the upstream end of the interior chamber;
a fluid outlet communicating with the downstream end of the interior chamber;
a filter element disposed within the interior chamber, the filter element being movable between an operable position wherein fluid flowing through the chamber passes through the filter element and a bypass position wherein fluid flowing through the chamber bypasses the filter element;
a magnet disposed within and movable with the filter element for capturing entrained ferrous debris in fluid flowing through the filter, the magnet having an annular body with an interior bore positioned to contact the fluid flow when the filter element is in the operable position and an end surface positioned to contact the fluid flow when the filter element is in the bypass position; and
a spring disposed in the housing yieldably biasing the filter element to its operable position;
the housing being formed by a first housing portion and a second housing portion connected together in a sealed relationship; and
a release mechanism holding the first and second housing portions together and being selectively removable to release the first and second housing portions from each other to permit replacement of the filter element.

14. The fluid filter of claim 13 wherein the first and second housing portions are telescopically connected together.

15. The fluid filter of claim 14 further comprising an O-ring disposed between the first and second housing portions forming the sealed relationship therebetween.

16. The fluid filter of claim 13 wherein the release mechanism comprises a removable locking clip.

17. The fluid filter of claim 16 wherein the locking clip extends through the first housing portion and the second housing portion and is removable to allow the housing portions to be separated.

18. The fluid filter of claim 17 and wherein the locking clip is a generally U-shaped spring clip having first and second legs that extend through aligned openings in the first housing portion to hold the housing portions together, and a bight portion that can be grasped to remove the locking clip.

* * * * *